(No Model.)
S. W. HATCHER.
COMBINED PLANTER AND FERTILIZER DISTRIBUTER.
No. 325,341. Patented Sept. 1, 1885.
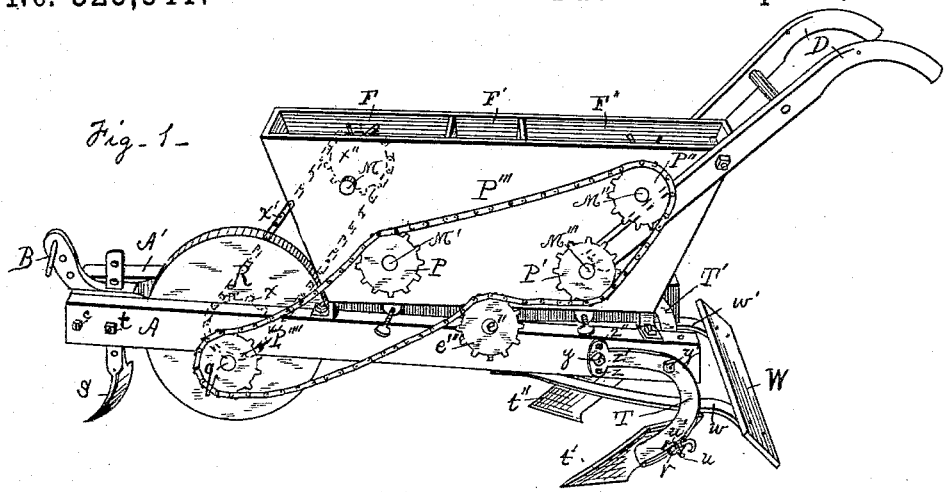
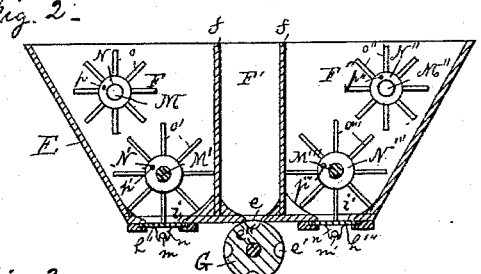
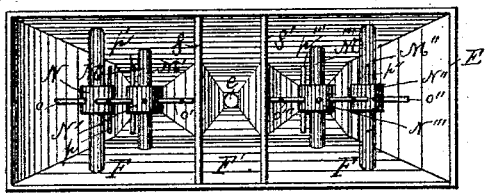
WITNESSES:
S. M. Jenkins
R. A. Worth
INVENTOR
S. W. Hatcher
BY H. N. Jenkins
ATTORNEY

UNITED STATES PATENT OFFICE.

SIDNEY W. HATCHER, OF KNOXVILLE, GEORGIA.

COMBINED PLANTER AND FERTILIZER-DISTRIBUTER.

SPECIFICATION forming part of Letters Patent No. 325,341, dated September 1, 1885.

Application filed May 25, 1885. (No model.)

*To all whom it may concern:*

Be it known that I, SIDNEY W. HATCHER, a citizen of the United States, and a resident of Knoxville, county of Crawford, State of Georgia, have invented new and useful Improvements in Combination Planter, Fertilizer-Distributer, and Cultivating-Plow, of which the following is a full and exact description, reference being had to the accompanying drawings, making part of this specification.

This invention relates to a new and improved farming implement; and it consists in the combination and arrangement, with a frame composed of two beams, as hereinafter described, of certain attachments for producing a combined fertilizer-distributer, grain-planter, and cotton-seed planter, or a cultivator-plow, as hereinafter more fully set forth.

On the drawings, Figure 1 is a perspective view of my improved implement with attachments as when used as a fertilizer distributer, grain-planter, and cotton-seed planter. Fig. 2 is a vertical longitudinal section of the fertilizer and seed-hopper. Fig. 3 is a top view of the aforesaid hopper, and Fig. 4 is a plan of the under side thereof. Fig. 5 shows the implement as when used as a single plow. Fig. 6 is a perspective view of one of the plow-standards; and Fig. 7 is intended to show how an ordinary adjustable standard may be applied to the beam without any change or addition of bolt-holes.

On the drawings, the letters A A' designate a pair of beams which are adapted to be secured closely together when the implement is to be used as a single plow, or to have their rear ends spread apart to form a V-shaped frame when the implement is to be used as a planter and distributer or as a double cultivating-plow.

A clevis, B, of any desired form, is secured by means of a bolt, c, between the forward ends of the beams, and suitable handles, D D', are connected with the rear end of the said beams or with the hopper E, as the use to which the implement is to be put may necessitate. The hopper E is divided by vertical cross-partitions $f f'$ into three compartments, F F' F'', the former to contain the fertilizer, the next for corn, peas, or other grain, and the latter for cotton-seed.

The bottom of the central compartment is provided with a small aperture, $e$, through which the grain is fed to the pockets $e'$ of a wheel, G, which is mounted on an axle, $e''$, having journal-bearings connected with the under side of the hopper, and having an outwardly-projecting end provided with a chain-wheel, $e'''$, through which motion is obtained, as hereinafter fully described.

The bottoms of the compartments F F'' are each provided with longitudinal slits or openings $i$ $i'$, beneath which are fitted a pair of slides $h$ $h'$ $h''$ $h'''$, adapted to operate in supporting guide-frames I I' that are secured to the under side of the hopper, as shown in Fig. 4.

The outer edges of the guide-frames I I' are provided with lugs $k$ $k'$ $k''$ $k'''$, having screw-threads cut therein to receive the thumb-screws $l$ $l'$ $l''$ $l'''$, the inner ends or points of which are provided with grooves $m$ $m'$ $m''$ $m'''$, adapted to fit in the open lugs $n$ $n'$ $n''$ $n'''$, formed in the under sides of the slides $h$ $h'$ $h''$ $h'''$, so that the turning of said screws shall increase or diminish the width of the openings between said slides, and thus provide means for regulating the discharge of the grain or seed through the same.

Journaled in the sides of each of the compartments F F' are a pair of shafts, M M' and M'' M''', having hubs N N' and N'' N''', around the peripheries of which are a series of pins, $o$ $o'$ $o''$ $o'''$. The pins of the lower hubs or shafts are made sufficiently long to operate in the slits or openings $i$ $i'$ in the bottom of the aforesaid compartments, and thus insure a proper discharge through the same. Each of the hubs N N' N'' N''' is provided with side pins, $p$ $p'$ $p''$ $p'''$, to assist in agitating the material and prevent any caking of the same around the shafts.

The shafts M' M'' M''' project through that side of the hopper which is next the chain-wheel $e'''$, and each is provided on the same line thereof with a similar wheel, P P' P'', so that all the wheels at the said side of the hopper shall be driven by a single chain, P''', from a chain-wheel, P'''', fitted on one end of the shaft $q$, journaled in the under edges of the beams A A' immediately in front of the hopper E. The shaft $q$ is furthermore provided, at its rear end, with a chain-wheel, (shown in dotted lines at $x$,) from which a chain-connection, $x'$, is made with a similar wheel, $x''$, that is fitted on the rear end of the shaft M.

Between the beams A A' the shaft $q$ is provided with a ground or traction wheel, R, the rotation of which imparts motion through the chains P''' and $x'$ to the shafts M M' M'' M''', as above indicated.

An opener, S, having a perforated shank, as shown in Fig. 1, is adapted to be secured in the forward part of the frame by a bolt, $t$, and near the rear end of each beam are secured the plow-standards T T', each having a covering or turning blade, $t'$ $t''$, secured thereto by means of bolts $u$ $u'$, provided with washers or clamps $u''$ $u'''$ and nuts $v$ $v'$, whereby they are adjusted and held at any suitable height on the standards.

The letter W designates a scraper, and $w$ $w'$ a pair of rods or bars whereby it is connected with the under surfaces of the rear portion of the beams, as shown.

$x'''$ is a perforated metal bar, adapted to be secured across the rear ends of the beams for the purpose of bracing and stiffening the frame, whether the beams be held in an open or closed position. This bar is omitted in Fig. 1 in order that the rear portion of the beams, &c., may be more clearly shown.

The peculiar form of the plow-standards adapts the same for connection with a single or double beam, there being sufficient spring to the upper ends to permit of their being thrust apart or contracted, as required. Each standard is secured by means of two bolts, $y$ $y'$, and the upper ends of each are provided with three holes, $z$ $z'$ $z''$, to allow the inclination of the standards to be changed as the nature of the soil may require.

When the implement is to be used for plowing or opening the land, the ground-wheel, hopper, and scraper are removed and the beams adjusted and provided with a single standard, as shown in Figs. 5 and 7, or with two standards, as shown in Fig. 1.

From the above description it will be seen that inasmuch as the journal-bearings of the stirrer and seed-wheel shafts are connected with the hopper the conversion of the implement from a cultivator to a planter or fertilizer-distributer, or vice versa, is readily effected by simply connecting or disconnecting the said hopper with or from the beams, and by applying or removing the driving-chains thereof, as described.

Having described my invention, what I claim as new, and desire to secure by Letters Patent, is—

1. In a combined planter, fertilizer-distributer, and cultivator, the combination of a pair of beams adapted to be adjustably connected, as described, with a detachable hopper having three compartments, each provided with a discharge-opening, a pair of stirrer-wheel shafts journaled in the sides of each end compartment, and a pocket-wheel shaft connected with the bottom of the central part of the hopper, as set forth, the said shafts provided with chain-wheels, whereby they are adapted to be driven from the chain-wheels of a ground-wheel axle, substantially as and for the purpose specified.

2. In combination with the beams A A', a perforated brace for adjustably connecting the rear ends thereof, a ground-wheel having an axle provided at each end with a chain-wheel, a hopper having three compartments with discharge-openings in the bottom of each, a pocket-wheel adapted to operate under the central compartment, and the end compartments provided with upper and lower shafts carrying stirrers and chain-wheels, as described, the pocket-wheel, lower stirrers, and the upper stirrer of the rear compartment adapted to be driven by a single chain, and the upper stirrer of the front compartment operated by a separate chain, substantially as described.

In testimony whereof I affix my signature in presence of two witnesses.

SIDNEY W. HATCHER.

Witnesses:
 A. L. NEWMAN,
 S. W. ADAMS.